United States Patent
Kim et al.

(10) Patent No.: US 9,025,544 B2
(45) Date of Patent: May 5, 2015

(54) CHANNEL ACCESS METHOD AND APPARATUS IN WIRELESS LOCAL AREA NETWORK SYSTEM

(75) Inventors: Eun Sun Kim, Anyang-si (KR); Yong Ho Seok, Anyang-si (KR); Byeong Woo Kang, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 271 days.

(21) Appl. No.: 13/577,210

(22) PCT Filed: Feb. 10, 2011

(86) PCT No.: PCT/KR2011/000895
§ 371 (c)(1),
(2), (4) Date: Aug. 3, 2012

(87) PCT Pub. No.: WO2011/099791
PCT Pub. Date: Aug. 18, 2011

(65) Prior Publication Data
US 2012/0320856 A1    Dec. 20, 2012

Related U.S. Application Data

(60) Provisional application No. 61/303,289, filed on Feb. 10, 2010, provisional application No. 61/406,156, filed on Oct. 24, 2010.

(30) Foreign Application Priority Data

Sep. 10, 2010  (KR) .................. 10-2010-0089097

(51) Int. Cl.
*H04W 74/00* (2009.01)
*H04W 28/00* (2009.01)
H04W 74/08 (2009.01)
*H04W 28/26* (2009.01)
H04W 84/12 (2009.01)

(52) U.S. Cl.
CPC .......... *H04W 74/0816* (2013.01); *H04W 28/26* (2013.01); *H04W 84/12* (2013.01)

(58) Field of Classification Search
None
See application file for complete search history.

(56) References Cited

U.S. PATENT DOCUMENTS 6,393,032 B1    5/2002    Ikegami
(Continued)

FOREIGN PATENT DOCUMENTS

EP    1931086    6/2008
JP    2003348641    12/2003
(Continued)

OTHER PUBLICATIONS

Taori, et al., "802.11 TGs MAC Enhancement Proposal", IEEE 802.11-05/0608r1, Jul. 2005, 36 pages.
(Continued)

*Primary Examiner* — Marcus R Smith
(74) *Attorney, Agent, or Firm* — Lee, Hong, Degerman, Kang & Waimey

(57) ABSTRACT

A channel access method and apparatus in a wireless local area network (WLAN) system are provided. A channel access method performed by an originating station in a wireless local area network (WLAN) system using a multi-channel including a plurality of subchannels includes transmitting RTS (Request To Send) frames to a destination station via the plurality of subchannels, respectively, receiving CTS (Clear To Send) frames transmitted by the destination station via the plurality of sub-channels in response to the RTS frames; and transmitting data via the subchannels via which the CTS frames have been received.

8 Claims, 11 Drawing Sheets

(56) References Cited

U.S. PATENT DOCUMENTS

| | | |
|---|---|---|
| 2004/0192312 A1 | 9/2004 | Li et al. |
| 2005/0089005 A1 | 4/2005 | Sakoda et al. |
| 2006/0159003 A1 | 7/2006 | Nanda et al. |
| 2007/0086341 A1 | 4/2007 | Ye |
| 2007/0248104 A1 | 10/2007 | Rudolf et al. |
| 2008/0080553 A1 | 4/2008 | Hasty et al. |
| 2008/0130519 A1 | 6/2008 | Bahl et al. |
| 2008/0192644 A1 | 8/2008 | Utsunomiya et al. |
| 2009/0196180 A1 | 8/2009 | Bahl et al. |
| 2009/0268674 A1 | 10/2009 | Liu et al. |
| 2010/0195580 A1 | 8/2010 | Samarasooriya et al. |
| 2011/0075607 A1 | 3/2011 | Kim et al. |
| 2011/0110351 A1 | 5/2011 | Seok |
| 2011/0194542 A1 | 8/2011 | Kim et al. |
| 2011/0317633 A1* | 12/2011 | Tan et al. ............ 370/329 |
| 2012/0008599 A1* | 1/2012 | Marin et al. ......... 370/336 |
| 2012/0014336 A1* | 1/2012 | Seok .................. 370/329 |
| 2012/0218983 A1* | 8/2012 | Noh et al. ............ 370/338 |
| 2013/0039313 A1 | 2/2013 | Hansen et al. |

FOREIGN PATENT DOCUMENTS

| | | |
|---|---|---|
| JP | 2008199102 | 8/2008 |
| JP | 2009-272887 | 11/2009 |
| KR | 10-2009-0131398 | 12/2009 |
| WO | 2009/154406 | 12/2009 |

OTHER PUBLICATIONS

Japan Patent Office Application Serial Number 2012-552796, Office Action dated Sep. 4, 2013, 2 pages, Sep. 22, 2014.

IP Australia Application Serial No. 2011215099, Search Report dated Sep. 4, 2013, 2 pages.

Taori, et al., "802.11 TGs MAC Enhancement Proposal," IEEE 802.11-05/0608r1, Jul. 2005, 36 pages.

Japan Patent Office Application Serial No. 2012-552796, Notice of Allowance dated Apr. 1, 2014, 3 pages.

United States Patent and Trademark Office U.S. Appl. No. 13/022,754, Office Action dated Apr. 26, 2013, 14 pages.

Korean Intellectual Property Office Application Serial No. 10-2010-0084795, Notice of Allowance dated Nov. 26, 2013, 2 pages.

United States Patent and Trademark Office U.S. Appl. No. 13/022,754, Final Office Action dated Sep. 25, 2013, 14 pages.

U.S. Appl. No. 13/022,754, Office Action dated Nov. 19, 2014, 20 pages.

Gong, et al., "RTS/CTS Operation for Wider Bandwidth," doc.: IEEE 802.11-10/1289r2, Nov. 2010, 17 pages.

Hart, et al., "Bandwidth Indication and Static/Dynamic Indication within Legacy," doc.: IEEE 802.11-10/1281r1, Nov. 2010, 11 pages.

Japan Patent Office Application Serial No. 2014-094566, Office Action dated Jan. 30, 2015, 3 pages.

* cited by examiner

CHANNEL ACCESS METHOD AND APPARATUS IN WIRELESS LOCAL AREA NETWORK SYSTEM

CROSS-REFERENCE TO RELATED APPLICATIONS

This application is the National Stage filing under 35 U.S.C. 371 of International Application No. PCT/KR2011/000895, filed on Feb. 10, 2011, which claims the benefit of earlier filing date and right of priority to Korean Application No. 10-2010-0089097, filed on Sep. 10, 2010, and also claims the benefit of U.S. Provisional Application Ser. No. 61/303,289, filed on Feb. 10, 2010, and U.S. Provisional Application Ser. No. 61/406,156, filed on Oct. 24, 2010, the contents of which are all incorporated by reference herein in their entirety.

TECHNICAL FIELD

The present invention relates to wireless communication and, more particularly, to a channel access method and apparatus in a wireless local area network (WLAN) system.

BACKGROUND ART

Recently, diverse wireless communication technologies are under development in line with the advancement of information communication technology. Among them, a wireless local area network (WLAN) is a technique allowing mobile terminals such as personal digital assistants (PDAs), lap top computers, portable multimedia players (PMPs), and the like, to wirelessly access the Internet at homes, in offices, or in a particular service providing area, based on a radio frequency technology.

Since IEEE (Institute of Electrical and Electronics Engineers) 802, a standardization organization of a WLAN technique, was established in February 1980, a great deal of standardization works have been conducted. The early WLAN technique supported the rate of 1~2 Mbps through frequency hopping, spread spectrum, infrared communications, and the like, by using a 2.4 GHz frequency based on IEEE 802.11, and recently, a maximum rate of 54 Mbps can be supported by employing orthogonal frequency division multiplex (OFDM) technology to the WLAN. Further, IEEE 802.11 are putting standards of various techniques, such as improvement of quality of service (QoS), allowing for compatibility of access point (AP) protocols, achievement of security enhancement, measurement radio resource measurement, wireless access vehicular environment, ensuring fast roaming, establishing a mesh network, interworking with an external network, wireless network management, and the like, into practical use or are still developing them.

Among the IEEE 802.11, IEEE 802.11b supports a maximum of 11 Mbs communication speed by using the frequency band of 2.4 GHz. IEEE 802.11a, which has been commercialized following the IEEE 802.11b, uses the frequency band of 5 GHz, rather than 2.4 GHz, to reduce the influence of interference compared with the considerably congested frequency band of 2.4 GHz, and has a communication speed increased up to a maximum 54 Mbps by using the OFDM technique. However, IEEE 802.11a has shortcomings in that its communication distance is shorter than that of IEEE 802.11b. Meanwhile, IEEE 802.11g uses the frequency band of 2.4 GHz, like IEEE 802.11b does, to implement a communication speed of a maximum 54 Mbps and satisfies backward compatibility, and as such, IEEE 802.11g has come into prominence. Also, IEEE 802.11b is superior to IEEE 802.11a in terms of the communication distance.

IEEE 802.11n has been lately stipulated as a technique standard to overcome the limitation of the communication speed which has been admitted as a weak spot of the WLAN. IEEE 802.11n aims to increase the speed and reliability of a network and extend an operation distance of a wireless network. In detail, IEEE 802.11n supports high throughput (HT) of more than a maximum 540 Mbps as a data processing speed, and is based on a multiple input and multiple output (MIMO) technique using multiple antennas at both ends of a transmission unit and a reception unit to minimize a transmission error and optimize a data rate. Also, IEEE 802.11n standard can use orthogonal frequency division multiplex (OFDM) to increase the speed as well as using a coding scheme in which several duplicates are transmitted to enhance data reliability.

As the WLAN is widely spreading and applications using WLAN are diversified, recently, the necessity for a new WLAN system emerges to support higher throughput than the data processing speed supported by IEEE 802.11n. A very high throughput (VHT) WLAN system is one of the newly proposed IEEE 802.11 WLAN systems in order to support a data processing speed of 1 Gbps or faster.

IEEE 802.11 TGac, conducting standardization of VHT wireless LAN system, is actively doing research on a scheme of using channel bandwidths of 8×8 MIMO and 80 MHz or higher in order to provide throughput of 1 Gbps or faster.

Meanwhile, a basic access mechanism of an IEEE 802.11 MAC (Medium Access Mechanism) is a CSMA/CA (Carrier Sense Multiple Access with Collision Avoidance) combined with binary exponential backoff. The CSMA/CA mechanism is also called a DCF (Distributed Coordination Function) of IEEE 802.11 MAC, basically employing a "listen before talk" access mechanism. In this type of access mechanism, a station (STA) first listens to a radio channel or a medium before starting a transmission. Upon listening, when it is detected that the medium is not is use, the listening station starts its transmission. Meanwhile, when it is detected that the medium is in use, the station enters a delay period determined by a binary exponential backoff algorithm, rather than starting its transmission.

The CSMA/CA mechanism includes virtual carrier sensing as well as physical carrier sensing in which the station (STA) directly listens to a medium). The virtual carrier sensing is to complement the limitation of the physical carrier sensing such as a hidden node problem, or the like. For the virtual carrier sensing, IEEE 802.11 MAC uses an NAC (Network Allocation Vector). The NAV is a value for the station (STA), which currently uses the medium or has authority to use the medium, to indicate a time remaining for the medium to be available, to other stations (STA). Thus, the value set as the NAV corresponds to a period during which the medium is due to be used by the station (STA) which transmits a corresponding frame.

One of procedures for setting the NAV is a procedure of exchanging an RTS (Request To Send) frame and a CTS (Clear To Send) frame. The RTS frame and the CTS frame include information informing reception stations (STA) about an upcoming frame transmission to delay a frame transmission by the reception stations. The information may be included in a duration field of each of the RTS frame and the CTS frame. When the RTS frame and the CTS frame are exchanged, a source station (STA) transmits an actual frame desired to be transmitted to a target station (STA).

When a channel bandwidth of 80 MHz or hither is used in the VHT WLAN system, a channel can be obtained by aggregating a plurality of subchannels. For example, a channel of 80 MHz may be obtained by aggregating four 20 MHz channels. When data is transmitted via a multi-channel including a plurality of subchannels, a channel access method and an apparatus supporting the method are required to be considered. The channel access method may include control frames for reserving a wireless medium, solving a concealment node problem, virtual carrier sensing, a method for transmitting the control frame, and a method for generating and transmitting the control frame.

SUMMARY OF INVENTION

Technical Problem

An object of the present invention is to provide a channel access method in a wireless local area network (WLAN) system and an apparatus for supporting the same.

Solution to Problem

In an aspect, a channel access method performed by an originating station in a wireless local area network (WLAN) system using a multi-channel including a plurality of subchannels includes transmitting RTS (Request To Send) frames to a destination station via the plurality of subchannels, respectively, receiving CTS (Clear To Send) frames transmitted by the destination station via the plurality of subchannels in response to the RTS frames, and transmitting data via the subchannels via which the CTS frames have been received.

When the CTS frames are received via a plurality of subchannels, the subchannels, via which the CTS frames have been received, may be contiguous subchannels.

Each of the RTS frames may include at least one of information regarding a frequency bandwidth intended to be used for the transmission of the data, information indicating subchannels for transmitting the data by the originating station, and information regarding as to whether or not the plurality of the subchannels constituting the multi-channel are available to be used.

Each of the CTS frames may include at least one of information regarding a frequency bandwidth permitted for the transmission of the data, information indicating subchannels permitted for the transmission of the data, and information regarding whether or not the plurality of the subchannels constituting the multi-channel are available to be used.

The RTS frame may include first duration information and second duration information as references of setting a network allocation vector (NAV) of a third station.

The first duration information may be information as a reference for NAV setting of a station which transmits a frame via one of the plurality of subchannels, and the second duration information may be information as a reference for NAV setting of a station which transmits a frame via two or more contiguous subchannels among the plurality of subchannels.

The second duration information may be a duration starting from an RTS frame transmission time point at which the originating station transmits the data to a point in time at which a reception acknowledge response with respect to the transmission of the data is received from the destination station.

The second duration information may be a transmission opportunity (TXOP) period obtained by the originating station.

The RTS frame may further include information indicating an access category of the data.

The method may further include receiving the CTS frames, and transmitting a CTS-to-self frame before transmitting the data, wherein the CTS-to-self frame may include a receiver address (RA) field in which a MAC address of the originating station is set as an RA.

The third station may set an NAV based on third duration information included in the CTS-to-self frame.

Advantageous Effects of Invention

The method and apparatus for preventing a collision, reserving a wireless medium, solving a concealment node problem, and detecting virtual carrier sensing are provided to be applicable to a wireless LAN system using a channel obtained by aggregating a plurality of subchannels. In addition, the channel access method including novel control frames proposed by the present invention and the method for transmitting the control frames guarantee the backward compatibility.

MODE FOR THE INVENTION

Exemplary embodiments of the present invention will now be described in detail with reference to the accompanying drawings.

Figure 1:
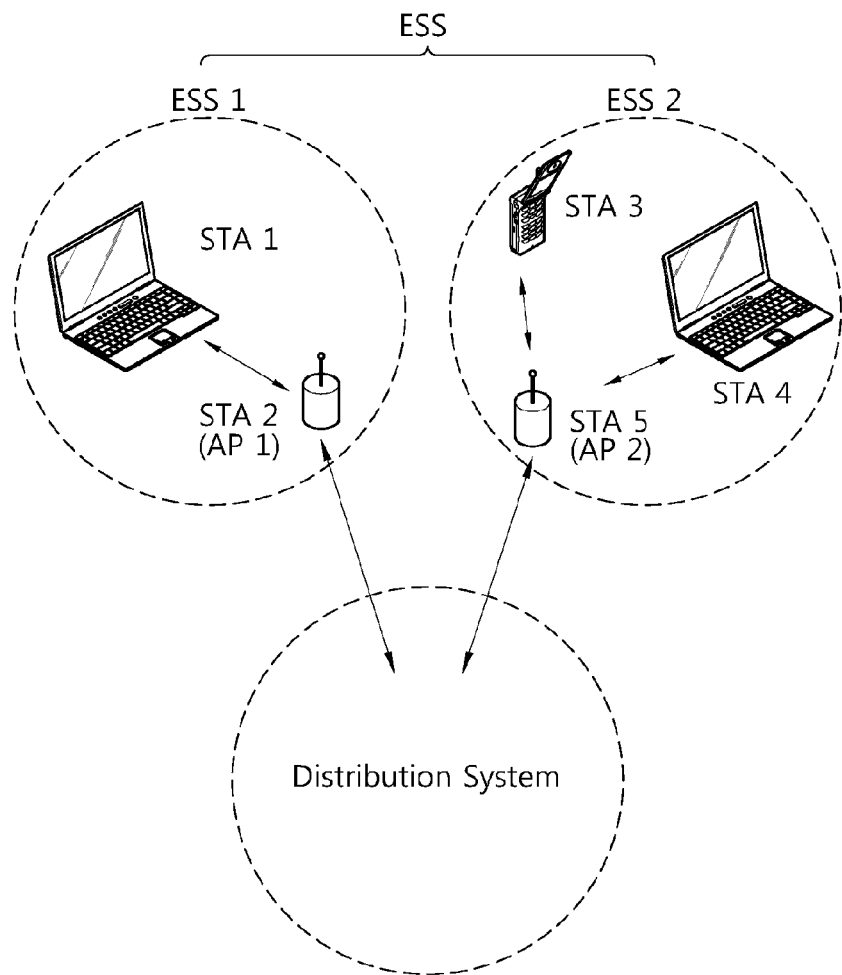
FIG. 1 illustrates the configuration of a wireless local area network (WLAN) system according to an exemplary embodiment of the present invention.

FIG. 1 illustrates the configuration of a wireless local area network (WLAN) system according to an exemplary embodiment of the present invention.

A WLAN system includes one or more of basic service sets (BSSs). A BSS refers to a set of stations (STAs) that can communicate with each other in synchronization, rather than a concept indicating a particular area. A BSS that supports data processing at a high speed of 1 GHz or faster is called a VHT BSS.

A VHT system including one or more VHT BSSs may use a channel bandwidth of 80 MHz, but it is merely illustrative. For example, the VHT system may use a channel bandwidth of 120 MHz, 160 MHz, or larger. The VHT system has a multi-channel environment including a plurality of subchannels each having a channel bandwidth of a certain size, e.g., a channel bandwidth of 20 MHz.

The BSS may be divided into an infrastructure BSS and an independent BSS (IBSS). FIG. 1 illustrates the infrastructure BSS. The infrastructure BSS (BSS1 and BSS2) includes one or more stations (STAs) (STA1, STA3, STA4), an access point (AP) as a station (STA) providing a distribution service, and a distribution system connecting a plurality of APs (AP1 and AP2). Meanwhile, the IBSS, not including an AP, includes every station (STA) as a mobile station. The IBSS establishes a self-contained network, not allowing an access to a distribution system (DS).

A station is a certain function medium including a medium access control (MAC) following the stipulation of IEEE 802.11 standard and a physical layer interface with respect to a wireless medium. A station includes both AP and non-AP stations in a broad sense. A station supporting high speed data processing of 1 GHz or faster in a multi-channel environment (to be described) is called a VHT station.

A station for radio communications may include a processor and a radio frequency (RF) unit, and may further include a user interface, a display unit, and the like. The processor, a function unit configured to generate a frame to be transmitted via a wireless network or process a frame received via the wireless network, performs various functions to control a station. The RF unit, which is functionally connected with the processor, is configured to transmit and receive frames via the wireless network for the station.

Among the stations STAs, a mobile terminal manipulated by a user is a non-AP STA (STA1, STA3, STA4), and simply referring to a station may indicate a non-AP STA. The non-AP STA may be referred to by other names such as terminal, wireless transmit/receive unit (WTRU), user equipment (UE), mobile station (MS), mobile terminal, mobile subscriber unit, or the like. A non-AP STA supporting high speed data processing at 1 GHz or faster in a multi-channel environment (to be described) is called a non-AP VHT STA.

The APs (AP1 and AP2) are functional entities for providing an access to the DS by way of a wireless medium for an STA (Associated Station) associated thereto. In the infrastructure BSS including the APs, in principle, communications between non-AP STAs are made by way of the APs, but when a direct link has been established, the non-AP STAs can directly communicate with each other. The AP may be also called by other names such as centralized controller, base station (BS), node-B, base transceiver system (BTS), site controller, and the like, than the named of AP. In the multi-channel environment (to be described), an AP supporting high speed data processing at 1 GHz or faster is called a VHT AP.

A plurality of infrastructure BSSs may be connected via the DS. The plurality of BSSs connected via the DS is called an extended service set (ESS). STAs included in the ESS may communicate with each other, and a non-AP STA may move from one BSS to another BSS within the same ESS while seamlessly performing communication.

The DS is a mechanism allowing one AP to communicate with another AP. Through the DS, an AP may transmit a frame for STAs associated to the BSS managed by the AP, transfer a frame when one STA moves to another BSS, or transmit or receive frames to and from an external network such as a wireline network. The DS may not be necessarily a network. Namely, the DS is not limited to any form so long as it can provide a certain distribution service stipulated in IEEE 802.11 standard. For example, the DS may be a wireless network such as a mesh network or a physical structure connecting the APs.

Figure 2:
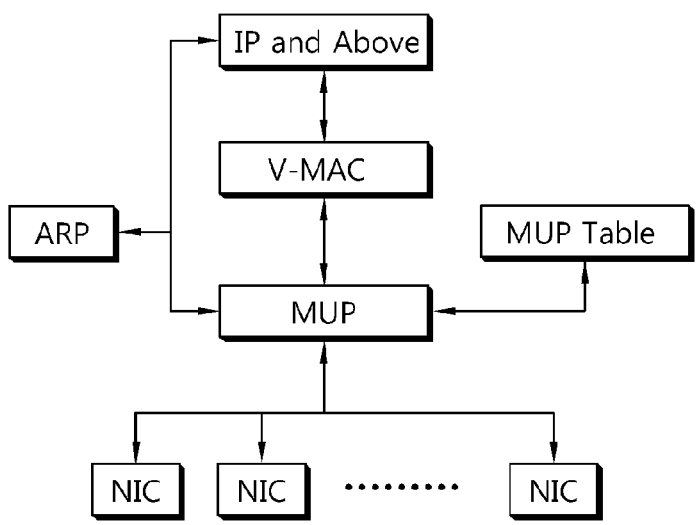
FIG. 2 illustrates a schematic block diagram of a multi-radio unification protocol.

FIG. 2 illustrates a schematic block diagram of a multi-radio unification protocol (MUP), an example of a protocol applicable to a VHT system including a plurality of network interface cards (NICs) each having an independent radio interface.

A station (STA) supporting the MUP includes a plurality of network interface cards (NICs). In FIG. 2, the respective NICs are illustrated to be separated, which means that MAC/PHY modules in the respective NICs are independently operated. Namely, the NICs discriminately illustrated in FIG. 2 are logical entities operating according to an individual MAC/PNY protocol. Thus, the plurality of NICs can be implemented as function entities which are physically differentiated or may be integrated into a single physical entity so as to be implemented.

The plurality of NICs may be classified into a primary radio interface and one or more secondary radio interfaces. The plurality of secondary radio interfaces may be classified into first, second, third secondary radio interfaces, or the like. The classification of the primary and secondary radio interfaces and/or the classification of the secondary radio interfaces may be policy-oriented or may be adaptively determined in consideration of a channel environment.

The plurality of NICs are integrally or collectively managed through the MUP. As a result, the NICs are recognized as if it is a single unit to the exterior. For this operation, the VHT system includes a virtual-medium access control (V-MAC), and through the V-MAC, an upper layer cannot recognize that is it operated by the plurality of NICs in a multi-radio channel In this manner, in the VHT system, the upper layer cannot recognize the multi-radio through the V-MAC. Namely, a virtual Ethernet address is provided.

A channel access procedure in the WLAN system according to exemplary embodiments of the present invention will now be described. The exemplary embodiments (to be described) relates to a WLAN system using a joint channel in which four contiguous subchannels each having a channel bandwidth of 20 MHz are combined (namely, a joint channel using a channel bandwidth of 80 MHz), but they are merely illustrative. Namely, it will be obvious to a person having ordinary skill in the art that the exemplary embodiments of the present invention can be applicable in the same manner to a VHT system including a plurality of subchannels, e.g., three or five or more subchannels. Also, the exemplary embodiments of the present invention are not limited to the VHT system having subchannels whose bandwidth is 20 MHz. For example, the bandwidths of the subchannels may be 5 MHz, 10 MHz, 40, MHz, or 80 MHz.

Figure 3:
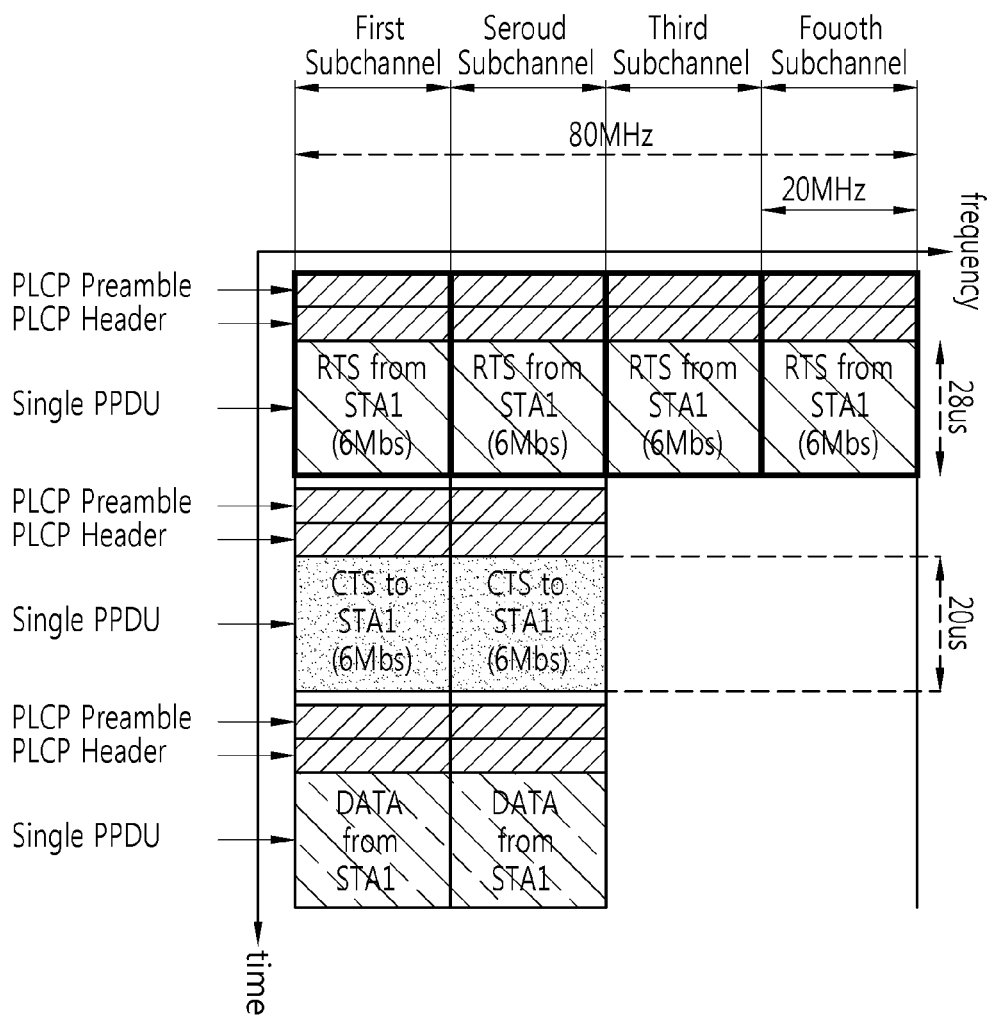
FIG. 3 is a diagram of a channel access and data transmission mechanism in the WLAN system.

FIG. 3 is a diagram of a channel access and data transmission mechanism in the WLAN system according to an exemplary embodiment of the present invention. Specifically, FIG. 3 shows an example of a channel access mechanism for solving a problem caused by a collision with a legacy station possibly generated when the existing EDCA channel access mechanism is applied in a WLAN system including only VHT stations or a WLAN system in which the legacy station and an VHT station coexist. The channel access mechanism may be called a frequency-selective EDCA. Here, the legacy station may be a conventional STA, besides a VHT STA, supporting IEEE (Institute of Electrical and Electronics Engineers) 802.11 a/b/g/n. This is the same in the followings.

In the VHT system using multi-channel including a plurality of subchannels, when some of subchannels constituting the multi-channel are used by a legacy STA and there occurs a collision with the legacy STA, the entire joint channel may not be used to considerably degrade throughput of the VHT system. In case in which one or more legacy STAs are operated in a certain subchannel among subchannels which are used by the VHT STA or desired to be used by the VHT STA, in order for the VHT STA to access the channel including the subchannels or the entire joint channel, all the subchannels constituting the channel or the joint channel must be in an idle state in which they are not occupied. Namely, there must be no collision with the legacy STA with respect to all the subchannel constituting the joint channel in order for the VHT STA to successfully access the channel.

In the present exemplary embodiment, a channel access mechanism in which an RTS frame is transmitted as a subchannel unit in order to prevent the problem of reduction in the throughput due to the collision with the legacy STA. Namely, an originating STA does not transmit RTS frames by using the entire multi-channel but transmits the RTS frames in units of the subchannels. A destination STA transmits CTS frames via the subchannels, via which the RTS frames have been received, in response to the RTS frames. In this case, the destination STA may transmit the CTS frames through some of the subchannels, via which, the RTS frames have been received. The originating STA may transmit a data frame, or the like, via the subchannels, via which the CTS frames have been received.

As a result, the originating STA may transmit data to the destination STA by using the subchannels, via which the CTS frame have been received from the destination STA, in response to the RTS frames which were transmitted by the originating STA via the respective subchannels.

With reference to FIG. 3, when the originating STA wants to transmit data, it transmits RTS frames by using the entire multi-channel. In the present exemplary embodiment, the entire multi-channel is not regarded as a single channel but the respective subchannels are regarded as independent channels and RTS frames are transmitted via the respective subchannels. In the example of FIG. 3, the process of transmitting of RTS frames by subchannels is illustrated to include a PLCP (Physical Layer Convergence Procedure) preamble, a PLCP header, and a single PPDU (PLCP Protocol Data Unit). Hereinafter, the RTS frames transmitting via each subchannel constituting the multi-channel will be referred to as multi-channel RTS frames, and CTS frames will be referred to as multi-channel CTS frames.

In the example illustrated in FIG. 3, a third subchannel and a fourth subchannel, among the entire subchannels, are used by a legacy STA. The third and fourth subchannels may be used by different legacy STAs. The reason for using the third and fourth subchannels are used (namely, by the legacy STA) is illustrative, and the present invention is not limited thereto. When the third and fourth subchannels are already in use, the RTS frames may not be successfully transmitted via the subchannels (e.g., a collision may occur), and a destination VHT STA may successfully receive the RTS frames transmitted via the first and second subchannels.

Upon receiving the RTS frames via some of the entire subchannels or via the entire subchannels, the destination STA transmits CTS frames by subchannels by using the corresponding subchannels. In the drawing, the transmission process of the CTS frames is illustrated as the PLCP (Physical Layer Convergence Procedure) preamble, the PLCP header, and the single PPDU (PLCP Protocol Data Unit) via the first and third subchannels.

When the CTS frames are received via the first and second subchannels, the source VHT STA may transmit data, or the like, by using the corresponding subchannels (i.e., the first and second subchannels). In FIG. 3, the transmission process of data via the first and second subchannels are illustrated as the PLCP (Physical Layer Convergence Procedure) preamble, the PLCP header, and the single PPDU (PLCP Protocol Data Unit) in the first and second subchannels.

In the example of FIG. 3, the data is transmitted via the first and second subchannels, which is merely illustrative. The data may be transmitted one, two, or four subchannels according to circumstances. Namely, when one subchannel has a subchannel bandwidth of 20 MHz as in the example of FIG. 3, a data transmission may be made by using a bandwidth of 20 MHz, 40 MHz, or 80 MHz.

In this case, when data is transmitted by using the bandwidth of 40 MHz, the data may be transmitted by using two subchannels each having 20 MHz bandwidth, and in this case, the data must be transmitted via contiguous subchannels (namely, continued in terms of frequency band).

To this end, in the present exemplary embodiment, when the destination STA, which has received the RTS frames from the originating STA, transmits CTS frames in response to the RTS frames, subchannels via which the destination STA transmits the CTS frames may be limited to contiguous subchannels. In other words, when the destination STA normally receives the RTS frames via the first and third subchannels and transmits CTS frames in response, the destination STA cannot transmit the CTS frames via the first and third subchannels because the first and third subchannels are not contiguous (namely, they are non-contiguous in terms of the frequency band). In this case, the destination STA may transmit the CTS frames via the first subchannel.

In the example of FIG. 3, the RTS frames and/or CTS frames exchanged before the data transmission may further include subchannel information. In this case, the subchannel information may include bandwidth information to be used for a data transmission, information regarding subchannels to be used for data transmission and reception, and information regarding whether or not each subchannel can be used (e.g., CCA information regarding each subchannel). A detailed format of the multi-channel RTS frame and the multi-channel CTS frame will be described later with reference to FIGS. 10 to 12.

According to the present exemplary embodiment, the plurality of VHT STA or the VHT STA and the legacy STA may transmit data, or the like, by using the entire joint channel. Also, according to the present exemplary embodiment in which the subchannel information is further included in the RTS frames or the CTS frames, a coexistence with the legacy STA can be more effectively guaranteed, the reliability of the data transmission can be enhanced, and the subchannels to be used for a data transmission and reception can be more adaptively determined according to the circumstances of the respective subchannels.

When the RTS frames and the CTS frames are exchanged via the plurality of subchannels in the multi-channel, NAV setting of the legacy STAs may be problematic. The legacy STAs set the NAV based on a duration field of the multi-channel RTS and that of the multi-channel CTS transmitted via the respective subchannels constituting the multi-channel. In the related art RTS frame/CTS frame exchange, when the CTS transmission fails, an RTS transmitter, which has transmitted the RTS frame, knows that protection has failed. When the STA (i.e., the originating STA or the RTS frame transmitter), which has transmitted the RTS frame, fails to receive the CTS frame, it does not transmit a frame. In this case, however, STAs outside the transmission coverage of the CTS frame cannot know about the failed protection due to the transmission failure of the CTS. Thus, in a state in which the originating STA transmits the RTS frame, when there is no data transmission after the lapse of 2×SIFS+CTS, the legacy STAs reset the NAV, which has been set by the legacy STAs themselves. In this manner, the legacy STAs can perform channel accessing again.

However, in the WLAN system using the multi-channel, when the multi-channel RTS frames/multi-channel CTS frames are transmitted via the respective subchannels, the legacy STAs cannot reset the NAV according to the conventional rule. Namely, when the multi-channel RTS frames/multi-channel CTS frames are not normally exchanged between the VHT STAs, in other words, when the multi-channel CTS transmission fails, the legacy STAs cannot recognize it, so they cannot perform resetting.

In order to solve the foregoing problem, the present proposes a new format of the RTS frame and an RTS frame/CTS frame exchanging mechanism. According to the present exemplary embodiment, in exchanging frames between the originating STA and the destination STA, an RTS frame, a CTS frame, and a CTS-to-self frame are sequentially transmitted and received. The RTS frame and the CTS frame exchanged in this case may be the multi-channel RTS frame and the multi-channel CTS frame transmitted via the respective subchannels as described above with reference to FIG. 3.

Hereinafter, the frame transmission and reception between the originating STA and the destination STA will be described, and then the RTS frame according to an exemplary embodiment of the present invention and the information included in the RTS frame applied to the present invention will be described.

Figure 4:
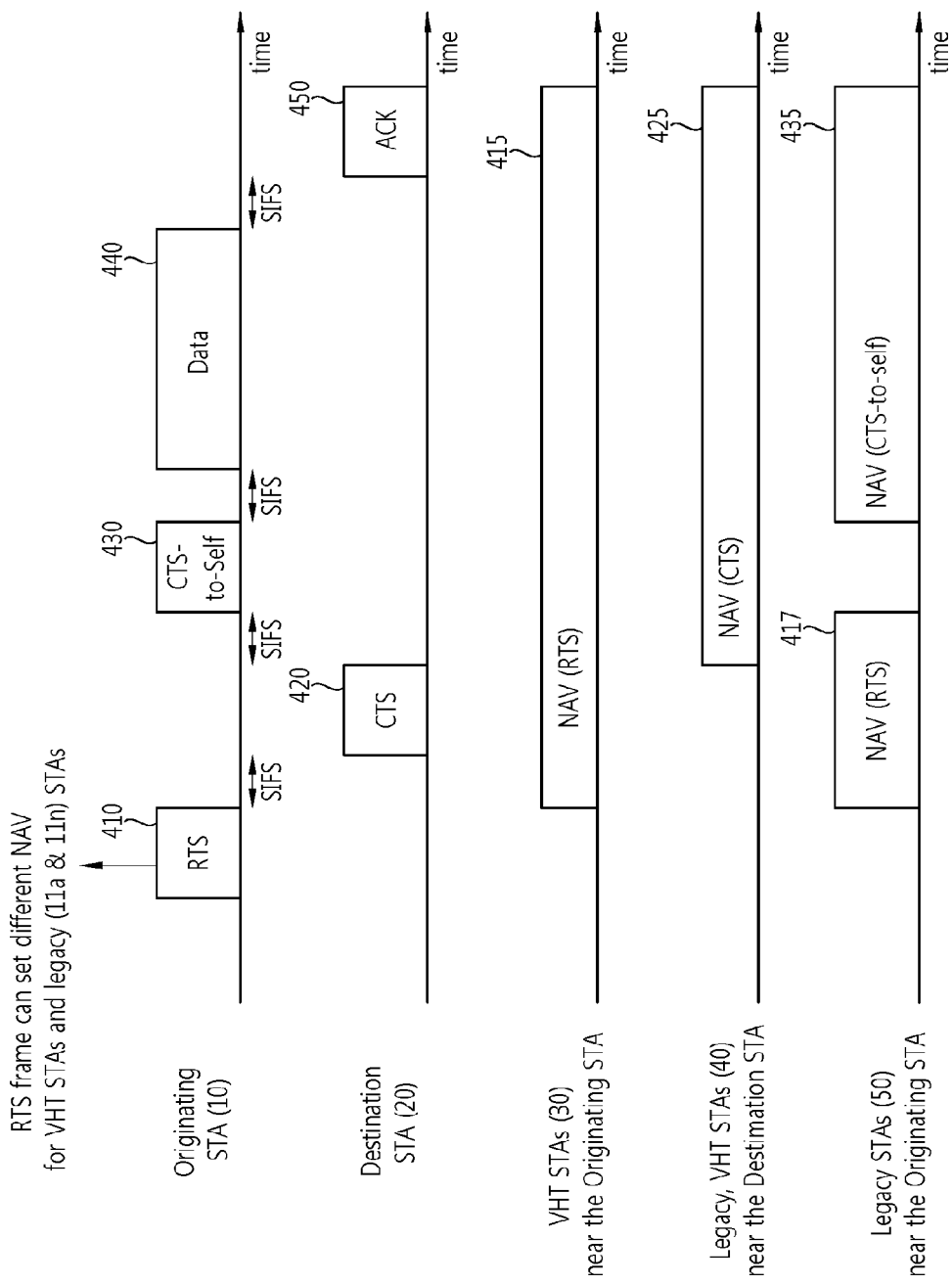
FIG. 4 illustrates a channel access procedure and a data frame transmission process.

FIG. 4 illustrates a channel access procedure and a data frame transmission process according to an exemplary embodiment of the present invention.

In the example of FIG. 4, an originating STA 10 intends to transmit a data frame 440 to a destination STA 20. The originating STA 10 may be called by other names such as source STA, resource, RTS transmitter, transmitter, and the like, and the destination STA 20 may be called by other names such as recipient, receiver, CTS transmitter.

It is assumed that a 11ac STA 30 is a VHT STA supporting IEEE 802.11ac standard and is located in the vicinity of the originating STA 10. Hereinafter, the presence of an STA_A near an STA_B means that the STA_A is present within the coverage of the STA_B. Namely, when the STA_A is located within the coverage in which the STA_A can receive a frame transmitted by the STA_B, it is expressed such that the STA_A is present near the STA_B.

11a/11n/11ac STAs 40 are STA(s) located near the destination STA 20. The STAs 40 may be legacy STAs supporting the IEEE 802.11 a/n standard or VHT STAs supporting the IEEE 802.11ac standard. 11a & 11n STAs 50 may be STAs located near the originating STA 10, which are IEEE 802.11 legacy STAs. In other words, the STAs 30 may be VHT STAs located in the vicinity of the originating STA 10, and the STAs 50 are legacy STAs located in the vicinity of the originating STA 10. The STAs 40 are STAs located in the vicinity of the destination STA 20. The STAs 40 may be legacy STAs or VHT STAs. The STAs 40 may be located outside the coverage of the originating STA 10.

The originating STA 10 transmits an RTS frame 410. The RTS frame 410 includes a duration field (duration1) for NAV setting of the STAs 50 near the originating STA 10 and a duration field (duration2) for NAV setting of the STAs 30 near the originating STA 10. The STAs 50 receive the RTS frame 410 and set the NAV until such time as a CTS-to-self frame 430 is transmitted based on the duration1. Simultaneously, the STAs 30 receive the RTS frame 410 and set the NAV based on the duration2. In this case, the duration2 may be a period required for the originating STA 10 to complete the entire transmission. For example, the duration2 may be a TXOP (transmission opportunity) period obtained by the originating STA 10 from an enhanced distributed channel access (EDCA) procedure.

Upon receiving the RTS frame 410, the destination STA 20 transmits a CTS frame 420. In this case, a duration field (duration3) of the CTS frame 420 may be used for NAV setting of the STAs 40. The duration3 may be set as a time obtained by subtracting an SIFS (short interframe space) and a CTS frame transmission time from the duration2.

The originating STA 10 transmits the CTS-to-self frame 430. In this case, the CTS-to-self frame 430 is a CTS frame in which an RA field is set as a MAC address of the originating STA. The CTS-to-self frame 430 can recognize both legacy STA and VHT STA. A duration field (duration4) to be used in the CTS-to-self frame 430 may be set as a time obtained by subtracting the SIFS and CTS-to-self frame transmission time from the duration3. The STAs 50 may receive the CTS-to-self frame 430 and set the NAV based on the duration4.

Thereafter, the originating STA 10 transmits a data frame 440 and receives a reception acknowledgement response ACK frame 450 from the destination STA 20.

According to the method illustrated in FIG. 4, although the originating STA 10 cannot recognize the RTS frame 410 proposed by the present invention as the conventional RTS frame, it can perform NAV setting for virtual carrier sensing (CS) and collision prevention. Namely, the RTS frame 410 newly proposed by the present invention and the backward compatibility of the data transmission method can be guaranteed.

In a different exemplary embodiment, the originating STA 10 may exchange the conventional RTS frame and CTS frame which can be recognized by the legacy STAs, instead of transmitting the CTS-to-self frame 430.

Figure 5:
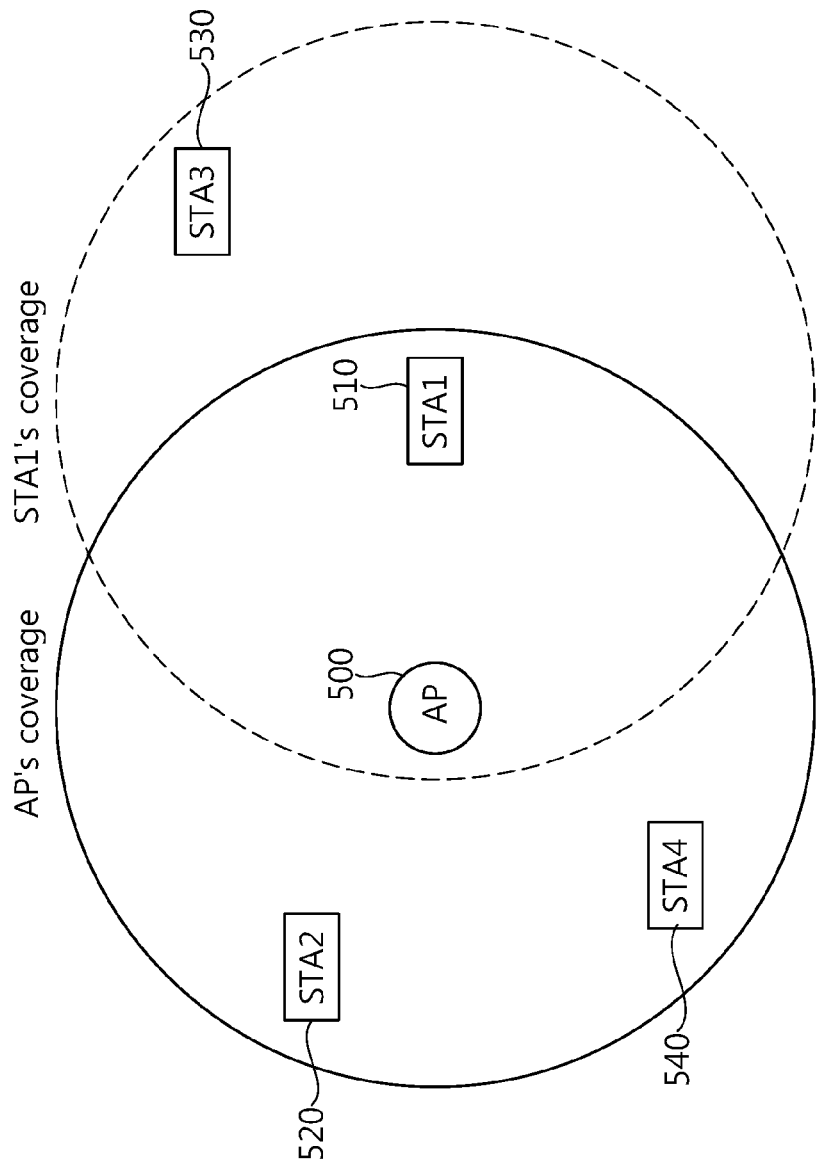
FIG. 5 illustrates an example of a WLAN system environment.

FIG. 5 illustrates an example of a WLAN system environment according to an exemplary embodiment of the present invention.

In FIG. 5, a circle indicated by a solid line denotes the coverage of an AP 500 and a circle indicated by a dotted line denotes the coverage of an STA1 510. A signal transmitted by the AP 500 may be received by an STA present within the coverage indicated by the solid line, while an STA located outside the coverage cannot receive the signal transmitted by the AP 500. It is assumed that STA1 510 and STA2 520 are VHT STAs, and STA3 530 and STA4 540 are legacy STAs. In the example of FIG. 5, STA1 510, STA2 520, and STA4 540 are located within the coverage of the AP 500, while the STA3 530 are located outside the coverage of the AP 500. In the aspect of the coverage of the STA1 510, the AP 500 and the STA3 530 are located within the coverage of the STA1 510, while the STA2 520 and the STA4 540 are located outside the coverage of the STA1 510. Hereinafter, a method for transmitting a control frame and a data frame will be described on the assumption of the environment of FIG. 5, but the environment assumed in FIG. 5 is merely an example of various environments, and the present invention is not limited to the environment of FIG. 5.

Figure 6:
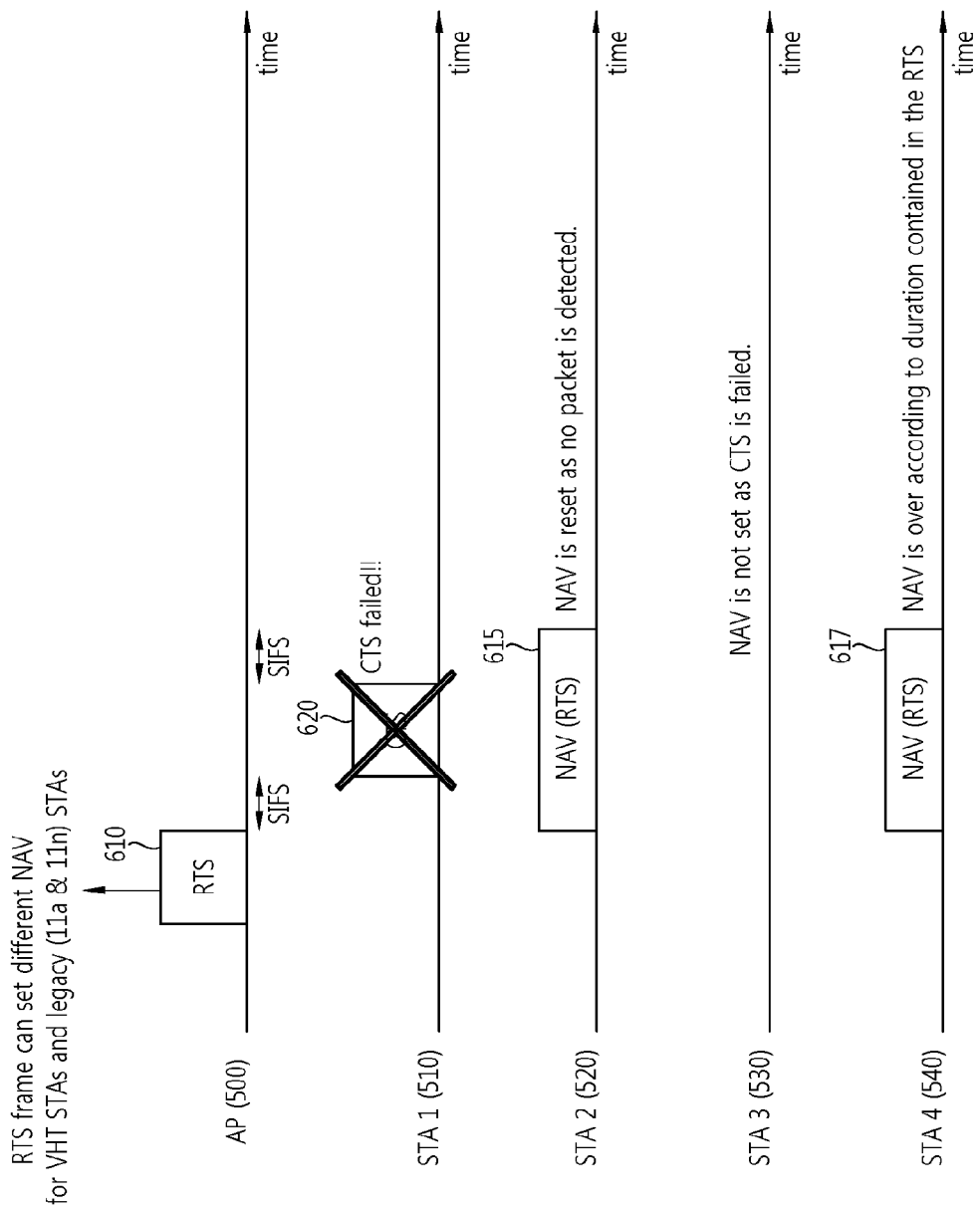
FIG. 6 shows an example of a case in which a transmission of a CTS frames fails in the environment of FIG. 5.

FIG. 6 shows an example of a case in which a transmission of a CTS frames fails in the environment of FIG. 5.

The AP 500 wants to transmit a data frame (not shown) to the STA1 510. As described above with reference to FIG. 4, in order to transmit the data frame, the AP 500 exchanges an RTS frame and a CTS frame with the STA1 510 and transmits a CTS-to-self frame. Thereafter, the AP 500 transmits the data frame to the STA1 510 and receives an ACK frame, as a reception acknowledgement response, from the STA1 510. In this case, it may be assumed that when the AP 500 transmits an RTS frame 610, a transmission of a CTS frame 620 of the STA1 510 fails. The STA1 510 receives the RTS frame 610 and sets the NAV until such time as a transmission of the AP 50 is completely terminated based on the duration2 of a second duration field of the RTS frame 610. In this situation, when a transmission of a CTS frame of the STA1 510 fails, the AP 50 does not transmit a data frame. Thus, NAV setting of the STA2 520 and the STA4 540 may be problematic. The setting of the NAV and deferring an access by the STA1 510, STA2 520, and STA4 540 in a state in which the AP 500 does not transmit a data frame may degrade an effective use of radio resources. This problem must be reflected in setting the first duration field and the second duration field in the RTS frame 610 transmitted by the AP 500.

A method for setting the NAV by a different STA when a transmission of the CTS frame 620 of the STA1 510 fails in the example of FIG. 6 will now be described. In a state in which the AP 500 does not transmit a data frame, when there is no data transmission after the lapse of a transmission time of the CTS frame 620 and the SIFS, the STA2 520 and the STA4 540 must be able to reset the NAV. The STA3 530, located outside the coverage of the AP 500, cannot receive the RTS frame 610, and does not set the NAV because the CTS frame 620 is not transmitted.

Thus, the first duration filed (duration1) included in the RTS frame 610 of the AP 600 may be set to be 2×SIFT+CTS frame transmission time, and the second duration field (duration2) may be set to be 4×SIFT+CTS frame transmission time+CTS-to-self frame transmission time+Data frame transmission time+ACK frame transmission time.

Upon receiving the RTS frame 610, the STA4 540 sets the NAV during the duration2, and thereafter, the STA4 540 may set the NAV or attempt channel accessing according to the state of the wireless medium (WM). The STA2 520 may set the NAV based on the duration2, or afterward, when there is no frame transmission after 2×SIFT+CTS frame transmission time, the STA2 520 may reset the NAV.

Figure 7:
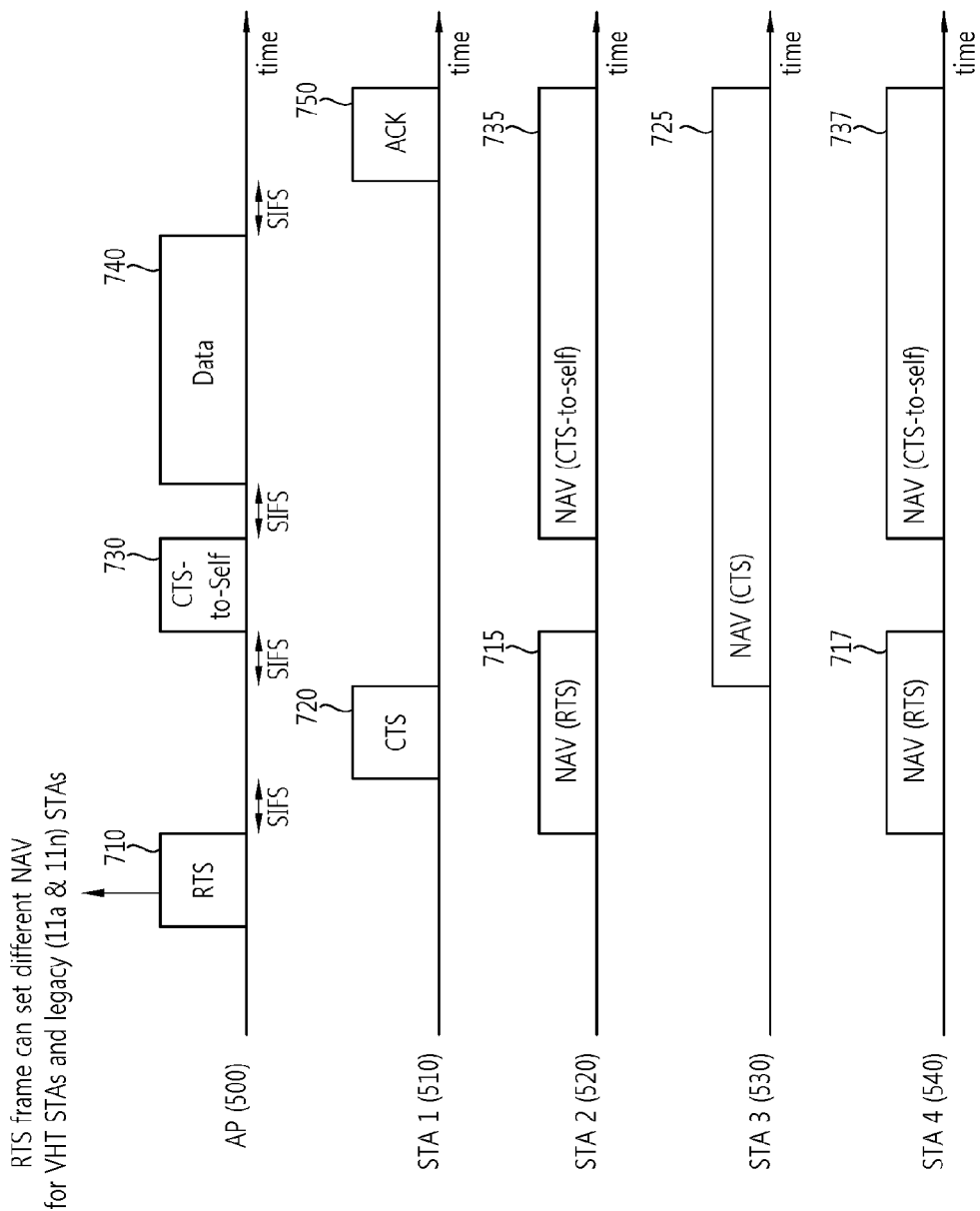
FIG. 7 illustrates the operations of the AP and the STAs.

FIG. 7 illustrates the operations of the AP and the STAs according to an exemplary embodiment of the present invention.

The AP 50 intends to transmit a data frame 740 to the STA1 510. As described above, before transmitting the data frame 740, the AP 500 exchanges an RTS frame 710 and a CTS frame 740 with the STA1 510 and transmits a CTS-to-self frame 730. Thereafter, the AP 500 transmits the data frame 740 to the STA 1 510 and receives an ACK frame 750, as a reception acknowledgement response, from the STA1 510.

The operations of the STA2 520, STA3 530, and STA4 540 in the process of transmitting and receiving a control frame and a data frame between the AP 500 and the STA1 510 will now be described. As described above with reference to FIG. 5, the STA2 520 is a VHT STA located within the coverage of the AP 500 but located outside the coverage of the STA1 510. Thus, the STA2 520 can receive the RTS frame 710 and the CTS-to-self frame 730 transmitted by the AP 500 but cannot receive the CTS frame 720 transmitted by the STA1 510. As described above, the RTS frame 710 has two duration fields. As described above, the duration1 indicated by the first duration field may be used for NAV setting of the legacy STA, and the duration2 indicated by the second duration field may be used for NAV setting of three VHT STA. Because the STA2 520 is a VHT STA, it can set the NAV based on the duration2 indicated by the second duration field of the RTS frame 710. In this case, the duration2 may be set up to a point in time at which the AP 500 completes a data transmission (namely, a point in time at which the ACK frame 750 is received in the example of FIG. 7). Thus, the STA2 may set the NAV up to a point in time at which the AP 500 finishes a transmission (i.e., the point in time at which the ACK frame 750 is received). For example, the STA2 520 may set a NAV 715 of 4×SIFT+CTS frame transmission time+CTS-to-self frame transmission time+Data frame transmission time+ACK frame transmission time (duration2), and the STA4 540 may set the NAV 717 of 2×SIFT+CTS frame transmission time (duration1).

However, because the STA2 520 cannot receive the CTS frame 720, it may be as good as a transmission failure of the CTS frame in FIG. 6 at the stance of the STA2 520. The STA2 520 may reset the NAV after 2×SIFT+CTS frame transmission time. The NAV 715 in FIG. 7 shows the example.

Following the transmission of the RTS frame 710, after the SIFS, the STA1 510 transmits the CTS frame 720. The STA3 530 may set a NAV 725 based on the duration3 set in the duration field of the duration2−(SIFT+CTS frame transmission time).

Upon receiving the CTS frame 715, the AP 500 transmits the CTS-to-self frame 730, before transmitting the data frame 740. The STA2 520 and the STA5 540 may set a NAV 735 and a NAV 737, respectively, based on the duration4 set in the duration field of the CTS-to-self frame 730 to defer a channel access. Accordingly, the data transmission can be protected by the AP 500. Also, the coexistence of the VHT STA and the legacy STA can be guaranteed.

Figure 8:
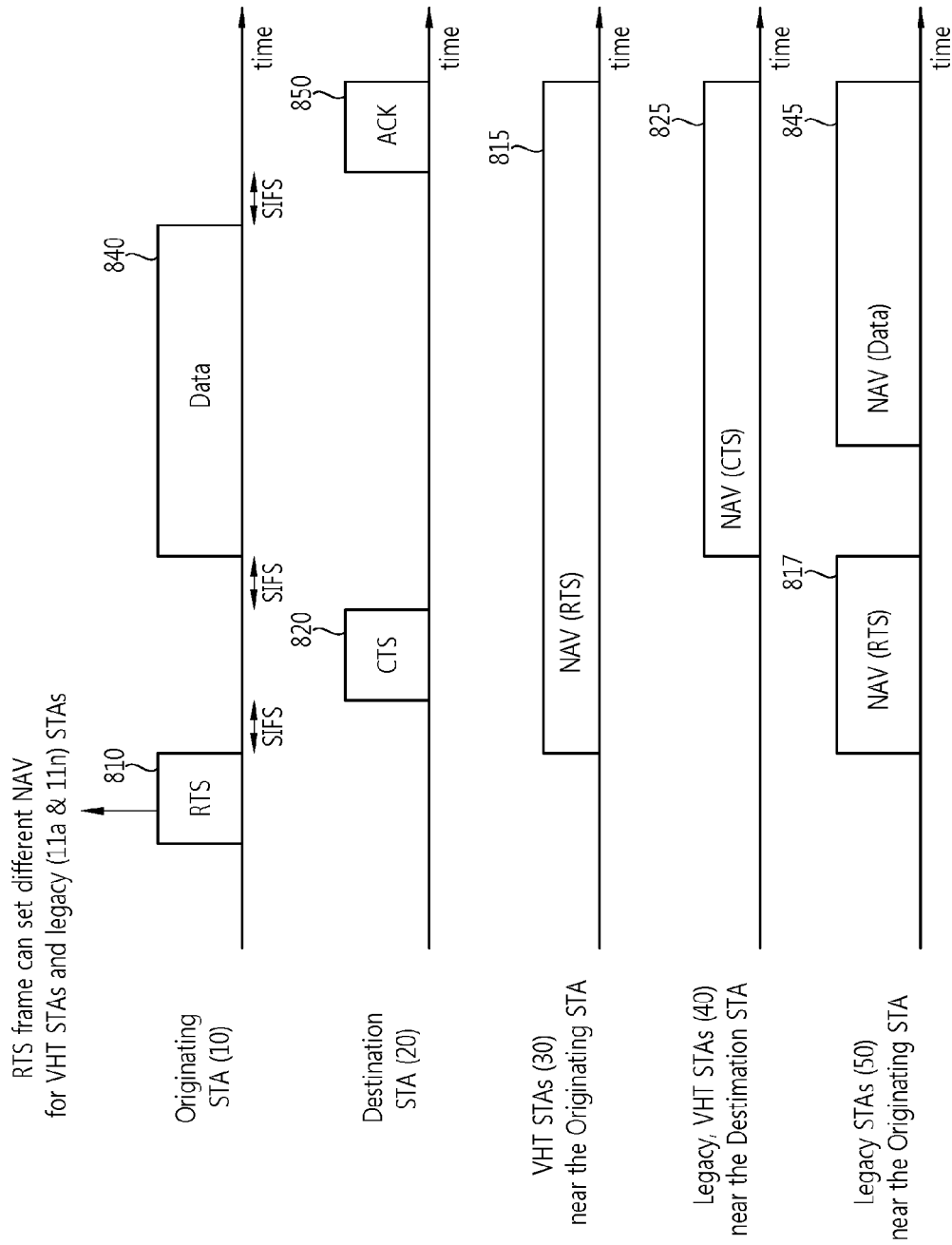
FIG. 8 illustrates another example of a method for transmitting a control frame and data.

FIG. 8 illustrates another example of a method for transmitting a control frame and data according to an exemplary embodiment of the present invention.

The embodiment of FIG. 8 is similar to that of FIG. 4, except that the transmission of CTS-to-self frame 430 is omitted. Namely, the originating STA 10 transmits an RTS frame 810, and receives a CTS frame 820 from the destination STA 20 in response. Similar to the example as described above with reference to FIG. 4, the RTS frame 810 includes two duration fields. The duration1 set in the first duration field may be used for NAV setting of a legacy STA. The duration2 set in the second duration field may be used for NAV setting of a VHT STA. The duration3 set in the duration field of the CTS frame 820 may be used for NAV setting of an STA overhearing the CTS frame.

The STAs located within the coverage of the originating STA 10 may set a NAV based on the duration1 or duration2 of the RTS frame 810. Namely, as described above, the VHT STAs (e.g., VHT STAs 30) may set the NAV based on the duration2 and the legacy STAs (e.g., legacy STAs 50) may set NAV based on the duration1. Hereinafter, the difference between the embodiment of FIG. 8 and the embodiment of FIG. 4 will now be described.

In the example of FIG. 4, the CTS-to-self frame which can be recognized even by the legacy STAs 50 is transmitted for the NAV setting of the legacy STAs 50. The CTS-to-self frame can be also used for NAV resetting of the VHT STA as described above with reference to FIG. 7. The example of FIG. 8 proposes a method for omitting the transmission of the CTS-to-self frame.

In the example of FIG. 8, the originating STA 10 receives the CTS frame 820, and immediately transmits a data frame 840, without transmitting a CTS-to-self frame. In this case, the data frame 840 is transmitted in the format which can be recognized even by the legacy STAs. Also, the data frame 840 is transmitted without being precoded so that the legacy STAs can recognize it. Accordingly, NAV setting of the legacy STA can be possible even without transmitting the CTS-to-self frame. FIG. 8 shows an example of a NAV 845 setting of the legacy STAs 50. Namely, the legacy STAs can set NAV setting by using the duration information of the duration field included in the data frame 840, and if necessary, the VHT STA can also reset the NAV.

Figure 9:
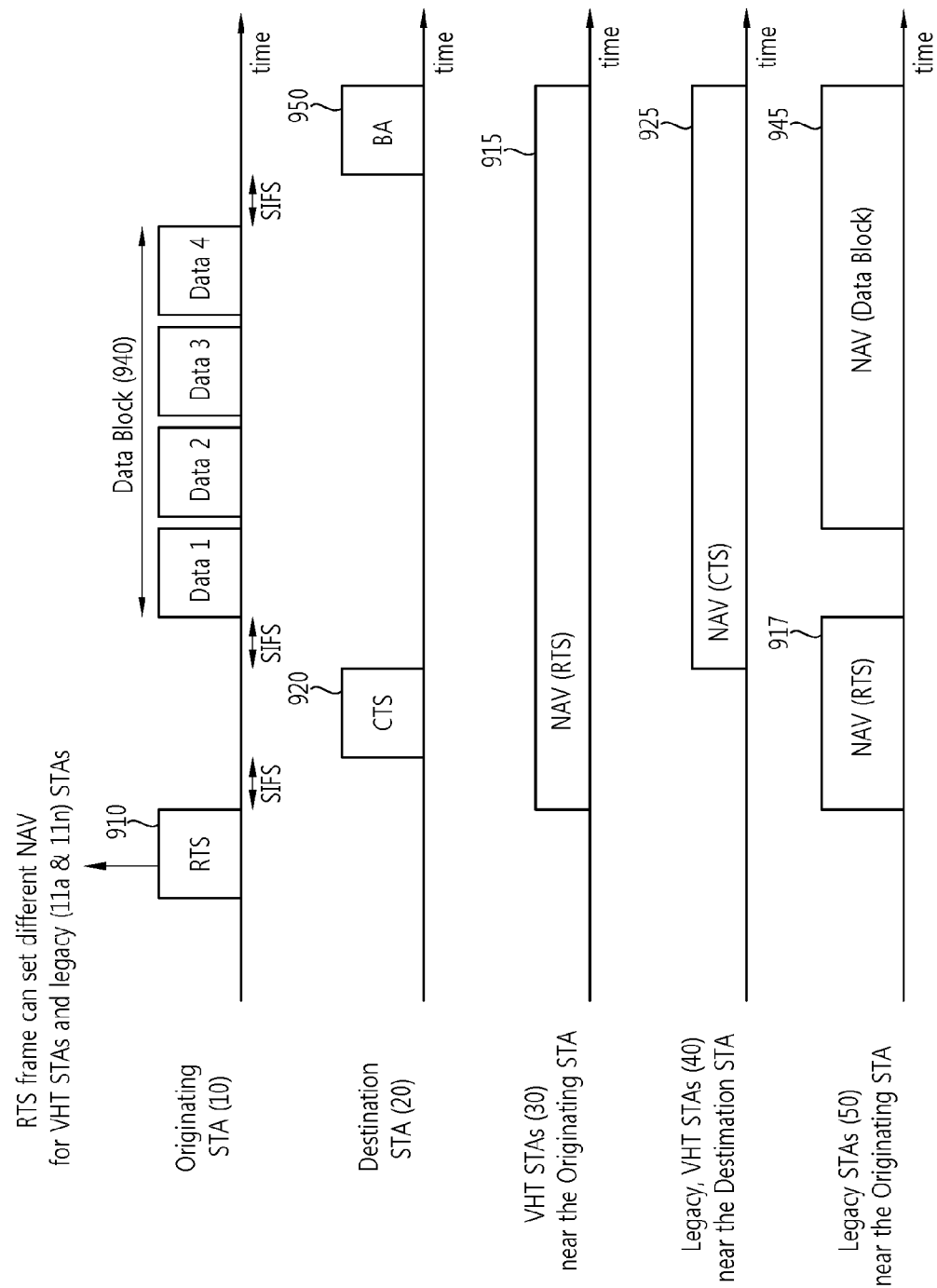
FIG. 9 illustrates another example of a method for transmitting a control frame and data.

FIG. 9 illustrates another example of a method for transmitting a control frame and data according to an exemplary embodiment of the present invention.

In the example of FIG. 9, the data frame 840 in FIG. 8 is transmitted as a data block 940, and an ACK frame 850 in FIG. 8 is transmitted as a block ACK (BA) 950. In transmitting the data block 940, a first data block (Data 1) may be transmitted in the form which can be recognized by a legacy STA, and the subsequent data blocks may be transmitted regardless of whether or not the legacy STA can recognize them or not. Thus, the data blocks starting from the data 2 may be transmitted in the format for the VHT STA.

Figure 10:
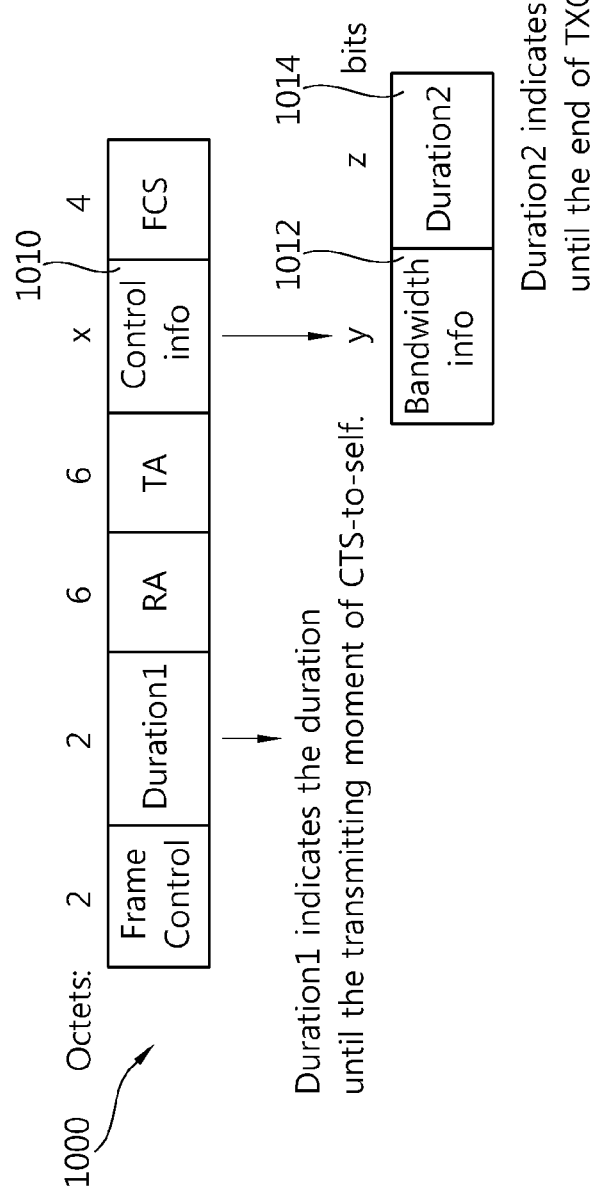
FIG. 10 and FIG. 11 illustrate an example of an RTS frame format proposed by the present invention.

FIG. 10 illustrates an example of an RTS frame format proposed by the present invention.

A frame control field includes frame control information, and an RA field includes a receiver address (RA) and a TA field includes a transmitter address (TA). These are the same as the RTS frame of the conventional IEEE 802.11 standard. A duration1 field includes duration information used for NAV setting of a legacy STA, and the RTS frame 1000 proposed by the present invention further includes a control info frame 1010. The control info field 1010 may include a bandwidth info subfield 1012 and a duration2 subfield 1014. The bandwidth info subfield 1012 includes information indicating the bandwidth of a channel for transmitting a data frame. The duration2 subfield 1014 includes the foregoing duration2 information and may be used for NAV setting of a VHT STA. In other words, it may be said that the RTS frame 1000 proposed by the present invention includes two duration fields; the duration1 field for a legacy STA, the duration2 field for a VHT STA. The two duration fields may be included in various forms in the RTS frame. As described above, the duration2 may be set as a period (e.g., TXOP time) until such time as a data transmission of an STA transmitting the RTS frame 1000 is finished. An access category subfield may be further included in the control info field 1010, and FIG. 11 shows an example thereof.

Figure 11:
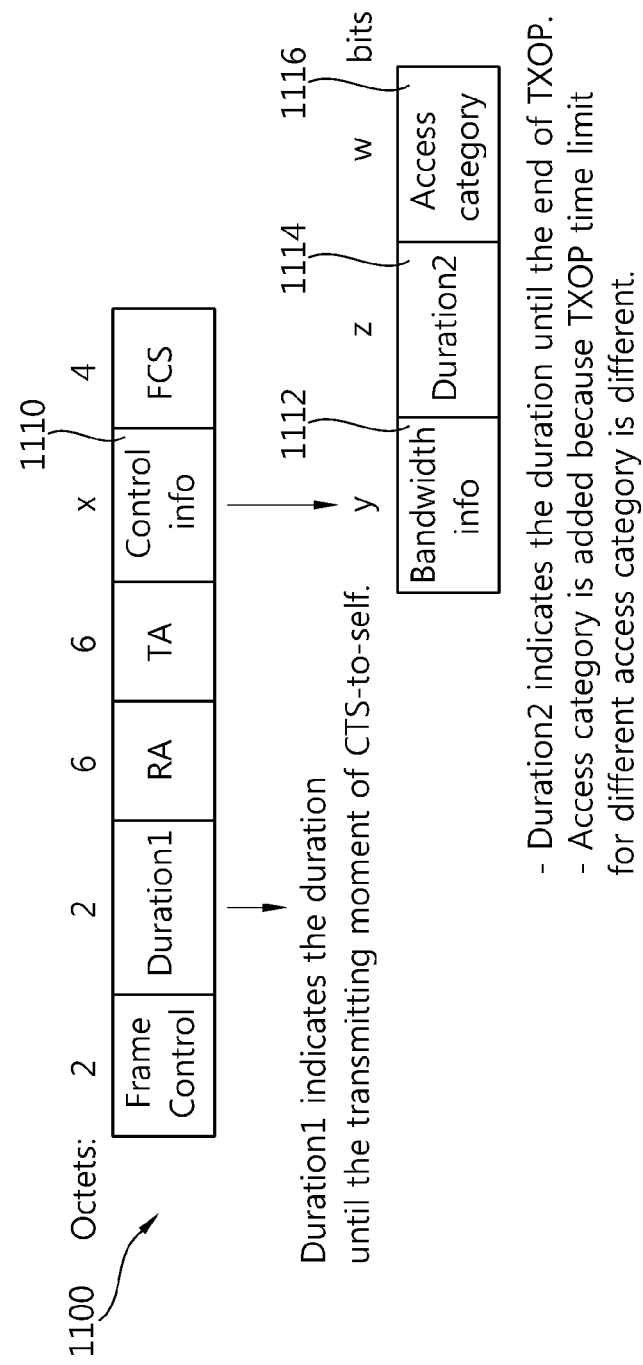

The access category subfield 1116 in FIG. 11 includes access category information. When a channel bandwidth designated in the CTS frame is smaller than a channel bandwidth designated in the bandwidth info subfield 1112 of the control info field 1110 of the RTS frame (e.g., although 80 MHz is designated in the RTS, but 40 MHz is designated in the CTS), time required for sending a packet having the same size is lengthened. Thus, there is a need to indicate a transmission time between the originating STA and the destination STA. In this respect, however, since a TXOP time limit is different by access category, it may be necessary to inform about the access category information. The access category subfield 1116 provides the access category information to thus allow for adjusting the time of TXOP.

Figure 12:
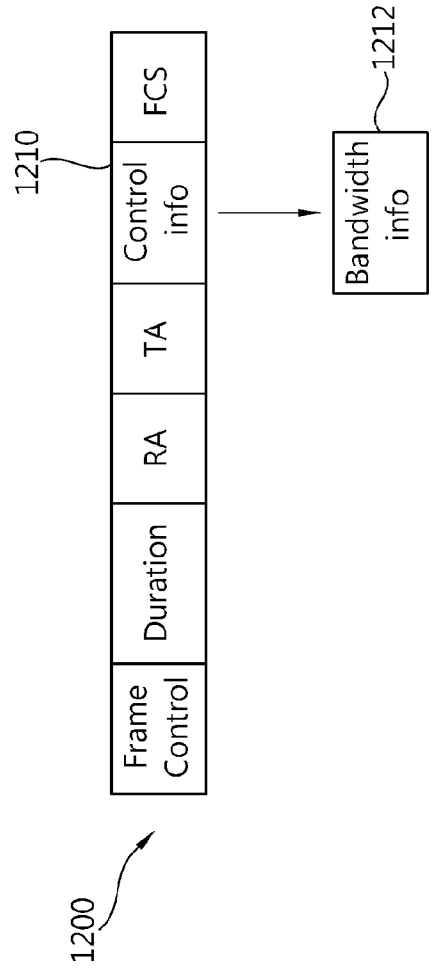
FIG. 12 illustrates an example of a CTS frame format proposed by the present invention.

FIG. 12 illustrates an example of a CTS frame format proposed by the present invention.

A CTS frame 1200 proposed by the present invention further includes a control info field 1210, compared with the conventional CTS frame. The control info field 1210 includes a bandwidth info 1212 indicating a channel bandwidth available for a frame transmission. The RTS frame formats and CTS frame formats illustrated in FIGS. 10 to 12 can be used in the exemplary embodiments of the present invention described above with reference to FIGS. 3 to 9.

Figure 13:
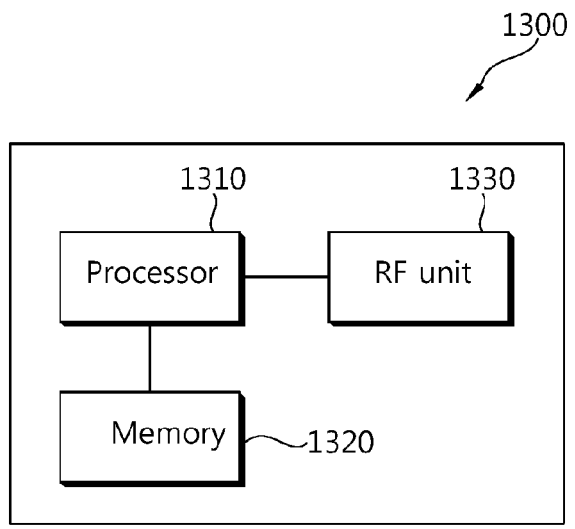
FIG. 13 is a schematic block diagram of a wireless apparatus according to an exemplary embodiment of the present invention.

FIG. 13 is a schematic block diagram of a wireless apparatus according to an exemplary embodiment of the present invention. A wireless apparatus 1300 may be an AP station or a non-AP station.

The wireless apparatus 1300 includes a processor 1310, a memory 1320, and an RF unit 1330. The RF unit 1330, transmitting and receiving a radio signal, implements a physical layer of IEEE 802.11 standard. The processor 1310, functionally connected to the RF unit 1330, implements a MAC layer and a physical layer of IEEE 802.11 standard. The processor 1310 may generate the RTS frame or the CTS frame proposed by the present invention and transmit the generate RTS frame or the CTS frame to a counterpart STA via the RF unit 1330 to implement the foregoing channel access, the control frame transmission/reception and data transmission method. The processor 1310 and/or the RF unit 1330 may include an ASIC (application-specific integrated circuit), a chip set, a logical circuit and/or a data processing device. The memory 1320 may include a ROM (read-only memory), a RAM (random access memory), a flash memory, a memory card, a storage medium, and/or any other storage device. When the embodiments are implemented by software, the foregoing schemes may be implemented by modules (processes, functions, or the like) performing the foregoing functions. The modules can be stored in the memory 1320 and executed by the processor 1310. The memory 1320 may be provided within or outside the processor 1310, or may be connected to the processor 1310 by means of a well-known unit.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A channel access method performed by an originating station in a wireless local area network (WLAN) system using a multi-channel including a plurality of subchannels, the method comprising:

transmitting RTS (Request To Send) frames to a destination station via the plurality of subchannels, respectively;

receiving CTS (Clear To Send) frames transmitted by the destination station via the plurality of subchannels in response to the RTS frames; and transmitting data via the subchannels via which the CTS frames have been received, wherein the RTS frame comprises first duration information and second duration information as references of setting a network allocation vector (NAV) of a third station, wherein the first duration information is information as a reference for NAV setting of a station which transmits a frame via one of the plurality of subchannels, and the second duration information is information as a reference for NAV setting of a station which transmits a frame via two or more contiguous subchannels among the plurality of subchannels, wherein the second duration information is a transmission opportunity (TXOP) period obtained by the originating station, and wherein the RTS frame further comprises information indicating an access category of the data in order to adjust a TXOP time.

2. The method of claim 1, wherein when the CTS frames are received via a plurality of subchannels, the subchannels, via which the CTS frames have been received, are contiguous subchannels.

3. The method of claim 1, wherein each of the RTS frames comprises at least one of information regarding a frequency bandwidth intended to be used for the transmission of the data, information indicating subchannels for transmitting the data by the originating station, and information regarding as to whether or not the plurality of the subchannels constituting the multi-channel are available to be used.

4. The method of claim 1, wherein each of the CTS frames comprises at least one of information regarding a frequency bandwidth permitted for the transmission of the data, information indicating subchannels permitted for the transmission of the data, and information regarding whether or not the plurality of the subchannels constituting the multichannel are available to be used.

5. The method of claim 1, wherein the second duration information is a duration starting from an RTS frame transmission time point at which the originating station transmits the data to a point in time at which a reception acknowledge response with respect to the transmission of the data is received from the destination station.

6. The method of claim 1, further comprising:
receiving the CTS frames, and transmitting a CTS-to-self frame before transmitting the data,
wherein the CTS-to-self frame comprises a receiver address (RA) field in which a MAC address of the originating station is set as an RA.

7. The method of claim 6, wherein the third station sets an NAV based on third duration information included in the CTS-to-self frame.

8. A device configured to perform a channel access method in a wireless local area network (WLAN) system using a multi-channel including a plurality of subchannels, the device comprising:
a radio frequency device; and
a processor operatively connected to the radio frequency device and configured to:
transmit RTS (Request To Send) frames to a destination station via the plurality of subchannels, respectively;
receive CTS (Clear To Send) frames transmitted by the destination station via the plurality of subchannels in response to the RTS frames; and
transmit data via the subchannels via which the CTS frames have been received,
wherein the RTS frame comprises first duration information and second duration information as references of setting a network allocation vector (NAV) of a third station,
wherein the first duration information is information as a reference for NAV setting of a station which transmits a frame via one of the plurality of subchannels, and the second duration information is information as a reference for NAV setting of a station which transmits a frame via two or more contiguous subchannels among the plurality of subchannels,
wherein the second duration information is a transmission opportunity (TXOP) period obtained by the originating station, and
wherein the RTS frame further comprises information indicating an access category of the data in order to adjust a TXOP time.

* * * * *